United States Patent
Sol

(10) Patent No.: US 10,077,074 B2
(45) Date of Patent: Sep. 18, 2018

(54) METHOD OF GUIDING WIRELESS CHARGING OF ELECTRIC VEHICLE

(71) Applicant: Hyundai Motor Company, Seoul (KR)

(72) Inventor: Un Hwan Sol, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/376,325

(22) Filed: Dec. 12, 2016

(65) Prior Publication Data

US 2018/0057055 A1 Mar. 1, 2018

(30) Foreign Application Priority Data

Aug. 23, 2016 (KR) .................. 10-2016-0107103

(51) Int. Cl.
| | |
|---|---|
| *G06T 7/00* | (2017.01) |
| *B62D 15/02* | (2006.01) |
| *G06T 7/73* | (2017.01) |
| *B60L 11/18* | (2006.01) |
| *B60R 1/00* | (2006.01) |
| *G06F 3/16* | (2006.01) |
| *G06K 9/00* | (2006.01) |
| *G06T 11/60* | (2006.01) |

(52) U.S. Cl.
CPC .......... *B62D 15/028* (2013.01); *B60L 11/182* (2013.01); *B60R 1/00* (2013.01); *G06F 3/16* (2013.01); *G06K 9/00812* (2013.01); *G06T 7/74* (2017.01); *G06T 11/60* (2013.01); *B60R 2300/607* (2013.01); *B60R 2300/806* (2013.01); *G06T 2207/30204* (2013.01); *G06T 2207/30264* (2013.01)

(58) Field of Classification Search
None
See application file for complete search history.

(56) References Cited

U.S. PATENT DOCUMENTS

| | | |
|---|---|---|
| 2012/0091959 A1 | 4/2012 | Martin |
| 2012/0095617 A1 | 4/2012 | Martin et al. |
| 2012/0262002 A1 | 10/2012 | Widmer et al. |
| 2015/0057932 A1 | 2/2015 | Nakagawa |
| | (Continued) | |

FOREIGN PATENT DOCUMENTS

| | | |
|---|---|---|
| JP | 2010-226945 A | 10/2010 |
| JP | 2011-182608 A | 9/2011 |
| | (Continued) | |

*Primary Examiner* — Delomia L Gilliard
(74) *Attorney, Agent, or Firm* — Morgan, Lewis & Bockius LLP

(57) ABSTRACT

Disclosed is a method of guiding wireless charging of an electric vehicle. The method includes recognizing, by a controller, an entrance of the electric vehicle into a parking slot for charging, displaying, by the controller, an around view monitor (AVM) image, the AVM image including a position of an inductive power reception module mounted in the electric vehicle and a position of an inductive power transmission module drawn on the parking slot for charging and, when the position of the inductive power reception module is aligned with the position of the inductive power transmission module, informing, by the controller, a driver about alignment of the positions of the inductive power reception module and the inductive power transmission module.

14 Claims, 8 Drawing Sheets

(56) References Cited

U.S. PATENT DOCUMENTS

| | | | |
|---|---|---|---|
| 2015/0061576 A1 | 3/2015 | Chen | |
| 2015/0286880 A1* | 10/2015 | Itou | B60L 11/1829 348/148 |
| 2015/0298558 A1* | 10/2015 | Lewis | B60L 11/182 701/22 |
| 2015/0306966 A1 | 10/2015 | Ichikawa | |
| 2016/0129799 A1* | 5/2016 | Kwon | B60L 11/1829 320/108 |
| 2016/0243955 A1* | 8/2016 | Yoshida | B62D 15/027 |
| 2017/0194817 A1* | 7/2017 | Takatsu | H02J 50/12 |

FOREIGN PATENT DOCUMENTS

| | | |
|---|---|---|
| JP | 2012-209882 A | 10/2012 |
| KR | 10-2012-0041446 A | 5/2012 |
| KR | 10-2014-0022867 A | 2/2014 |
| KR | 10-2016-0055516 A | 5/2016 |

* cited by examiner

METHOD OF GUIDING WIRELESS CHARGING OF ELECTRIC VEHICLE

CROSS-REFERENCE TO RELATED APPLICATION

The present application claims priority to Korean Patent Application No. 10-2016-0107103, filed on Aug. 23, 2016, the entire contents of which is incorporated herein for all purposes by this reference.

BACKGROUND OF THE INVENTION

Field of the Invention

The present invention relates to a method of guiding wireless charging of an electric vehicle, and more particularly, to a technique which is capable of maximizing the charging efficiency of a wireless charging electric vehicle of an electromagnetic induction type by guiding the electric vehicle to optimally align an inductive power reception module mounted in the electric vehicle with an inductive power transmission module mounted at a parking slot for charging, based on Around View Monitor (AVM).

Description of Related Art

In general, a wireless charging technique of an electromagnetic induction type enables a battery to be charged in an electromagnetic induction principle by inducing electric power to a coil of an inductive power reception module due to the electromagnetic field generated from an inductive power transmission module.

In such a wireless charging technique of an electromagnetic induction type, since the alignment accuracy between the coil of the inductive power transmission module and the coil of the inductive power reception module exerts an influence on the charging efficiency, it is very important to optimally align the coils of the inductive power transmission module and the inductive power reception module with each other.

In the wireless charging system of the electric vehicle, the inductive power reception module is mounted in the electric vehicle and the inductive power transmission module is buried under the ground near a parking slot for charging. It is not easy for a driver to optimally align the inductive power reception module mounted in the electric vehicle with the inductive power transmission module burred under the ground near the parking slot. That is, it is difficult for a driver to drive the electric vehicle such that the inductive power reception module is aligned with the inductive power transmission module.

To this end, according to the related art, a received signal strength indicator, which is a wireless signal, is analyzed to detect a position of the inductive power transmission module placed at the parking slot for charging. However, this scheme is deteriorated in accuracy and requires a separated wireless signal transmitter provided in the parking slot for charging.

Specifically, in the case that the alignment is performed based on the intensity of a wireless signal (for example, sound volume) without visually confirming the position in terms of a driver who drives an electric vehicle to align the inductive power transmission module and the inductive power reception module with each other, it is difficult to expect high alignment accuracy.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of guiding wireless charging of an electric vehicle, which is capable of guiding a wireless charging electric vehicle of an electromagnetic induction type to optimally align an inductive power reception module mounted in the electric vehicle with an inductive power transmission module mounted in a parking slot by displaying the positions of the inductive power reception module and the inductive power transmission module through AVM in real time, maximizing the charging efficiency of the electric vehicle.

The technical problems to be solved by the present inventive concept are not limited to the aforementioned problems, and any other technical problems not mentioned herein will be clearly understood from the following description by those skilled in the art to which the present invention pertains. In addition, the objects and advantages of the present invention may be realized by instrumentalities and combinations pointed out in the appended claims.

According to various aspects of the present invention, there is provided a method of guiding wireless charging of an electric vehicle, which may include recognizing, by a controller, an entrance of the electric vehicle into a parking slot for charging; displaying an around view monitor (AVM) image by the controller, wherein the AVM image includes a position of an inductive power reception module mounted in the electric vehicle and a position of an inductive power transmission module drawn on the parking slot for charging; and, when the position of the inductive power reception module is aligned with the position of the inductive power transmission module, informing, by the controller, a driver about alignment of the positions of the inductive power reception module and the inductive power transmission module.

According to another aspect of the present invention, there is provided a method of guiding wireless charging of an electric vehicle, which may include recognizing, by a controller, an entrance of the electric vehicle into a parking slot for charging; detecting, by the controller, a position of an inductive power transmission module based on indicators drawn on the parking slot; displaying an around view monitor (AVM) image by the controller, wherein the AVM image includes a position of an inductive power reception module mounted in the electric vehicle and the detected position of the inductive power transmission module; and, when the position of the inductive power reception module is aligned with the position of the inductive power transmission module, informing, by the controller, a driver about alignment of the positions of the inductive power reception module and the inductive power transmission module.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
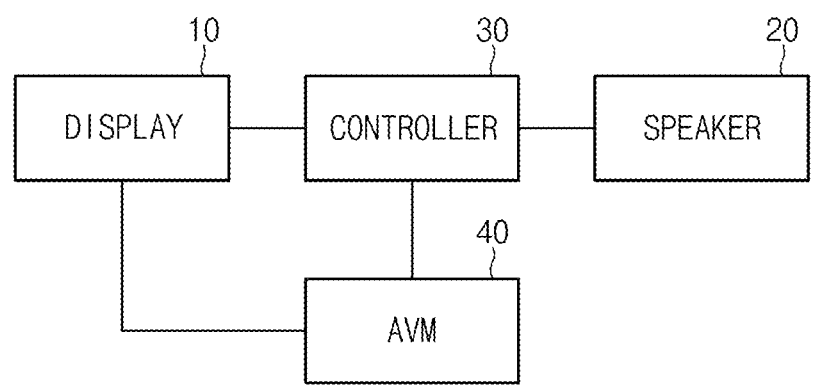
FIG. 1 is a block diagram illustrating a system for guiding wireless charging of an electric vehicle to which an exemplary embodiment of the present invention is applied.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

FIG. 1 is a block diagram illustrating a system for guiding wireless charging of an electric vehicle to which an exemplary embodiment of the present invention is applied.

Referring to FIG. 1, the system for guiding wireless charging of an electric vehicle to which an exemplary embodiment of the present invention is applied includes a display 10, a speaker 20, a controller 30, and an AVM 40.

Describing each of the elements mentioned above, the display 10 displays an AVM image generated from the AVM 40 thereon. In addition, the display 10 further displays the positions of an inductive power reception module and an inductive power transmission module in the AVM image under control of the controller 30.

Figure 2:
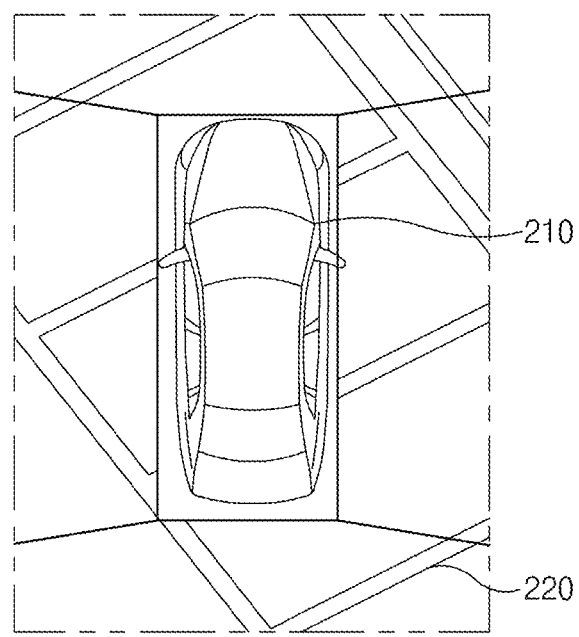
FIG. 2 is a view illustrating an example of an AVM image used in the present invention.

For example, FIG. 2 illustrates the AVM image generated from the AVM 40.

As shown in FIG. 2, the AVM image, which is taken from top around an electric vehicle 210, includes front/rear/left/right images of the electric vehicle 210. In the instant case, reference numeral 220 represents a parking slot line.

Figure 3A:
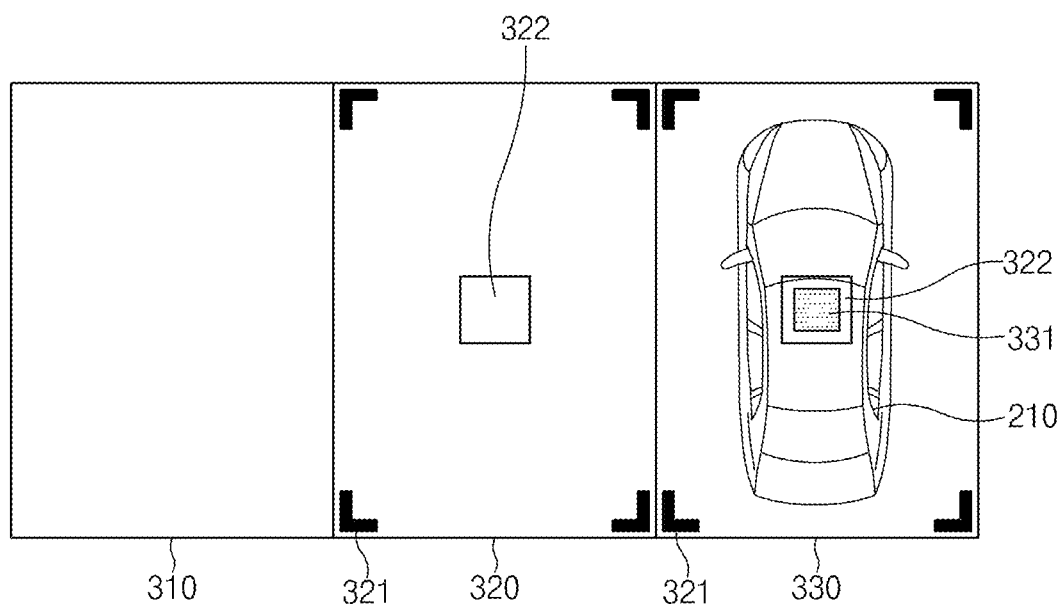
FIG. 3A is a view illustrating an example of a parking slot for charging used in the present invention.

In addition, FIG. 3A shows a parking slot for charging.

As shown in FIG. 3A, reference numeral 310 represents a general parking slot including only parking slot lines and reference numerals 320 and 330 represent parking slots for charging in which indicators 321 are drawn at edge portions of the parking slot to inform of the parking slot for charging. In the instant case, the indicator 321 may be used to detect (or determine) the position of an inductive power transmission module in a parking slot for charging in which the position 322 of the inductive power transmission module is not drawn.

Figure 3B:
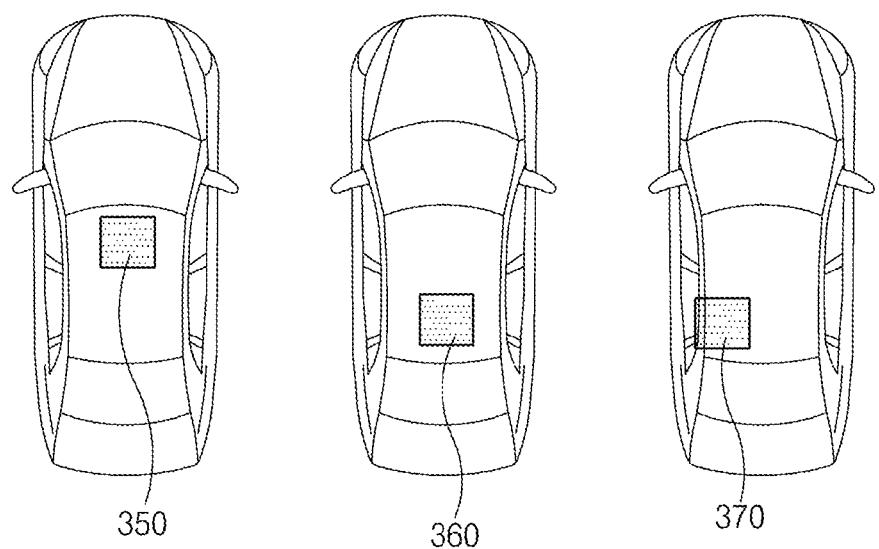
FIG. 3B is a view illustrating a position of an inductive power reception module in an electric vehicle used in the present invention.

Reference number 331 represents the position of the inductive power reception module mounted in an electric vehicle 210 and reference numeral 330 represents a state that the position 331 of the inductive power reception module is optimally aligned with the position 322 of the inductive power transmission module. In the instant case, as shown in FIG. 3B, the inductive power reception module 331 mounted in the electric vehicle 210 may be placed at a center portion of the electric vehicle 210. The inductive power reception module 331 may be placed behind the center of the electric vehicle 210. Alternatively, the inductive power reception module 331 may be placed left behind the center of the electric vehicle 210. Of course, although not shown in FIG. 3B, the inductive power reception module 331 may be placed right behind the center of the electric vehicle 210.

Meanwhile, when the position of the inductive power transmission module is denoted on the parking slot for charging, the display 10 displays its real image. The display 10 displays a graphic image (including a rectangular shape), which has the same shape as that of the real image, under control of the controller 30 from a time point when the position of the inductive power transmission module is covered with the electric vehicle 210 such that the AVM 40 cannot photograph the position of the inductive power transmission module, and allows the graphic image to track the electric vehicle 210 as the electric vehicle moves. In addition, when the position of the inductive power transmission module is not drawn on the parking slot for changing, the display 10 displays the position of the inductive power transmission module detected by the controller 30. In FIG. 3A, reference numeral 322 represents the position of the inductive power transmission module drawn on the bottom of the parking slot for charging in the real image represented by reference numeral 320, and reference numerals 322 and 331 are graphic images in the image represented by reference numeral 330.

Figure 4:
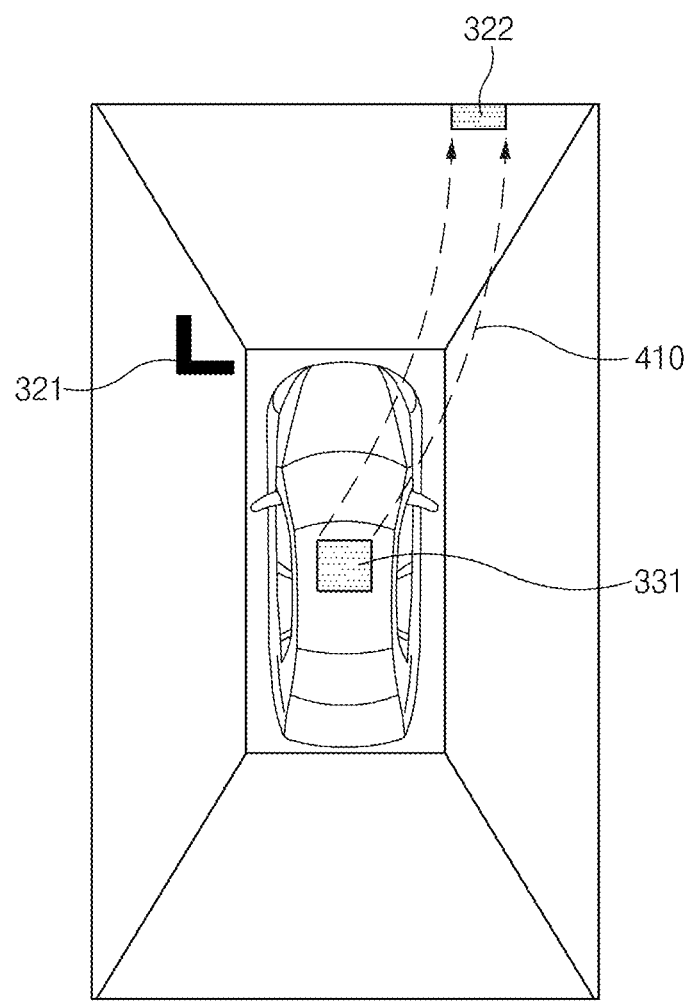
FIG. 4 is a view illustrating a moving guide line according to an exemplary embodiment of the present invention.

In addition, the display 10 may further display a moving guide line 410 to help to align the position 322 of the inductive power transmission module in the parking slot for charging with the position 331 of the inductive power reception module in the electric vehicle 210. For example, as shown in FIG. 4, the moving guide line 410 may be displayed under control of the controller 30.

In addition, the display 10 may display a guide character together with the moving guide line 410. In the instant case, for example, as the guide character, text "Please move the vehicle in one o'clock direction" may be displayed.

Figure 5:
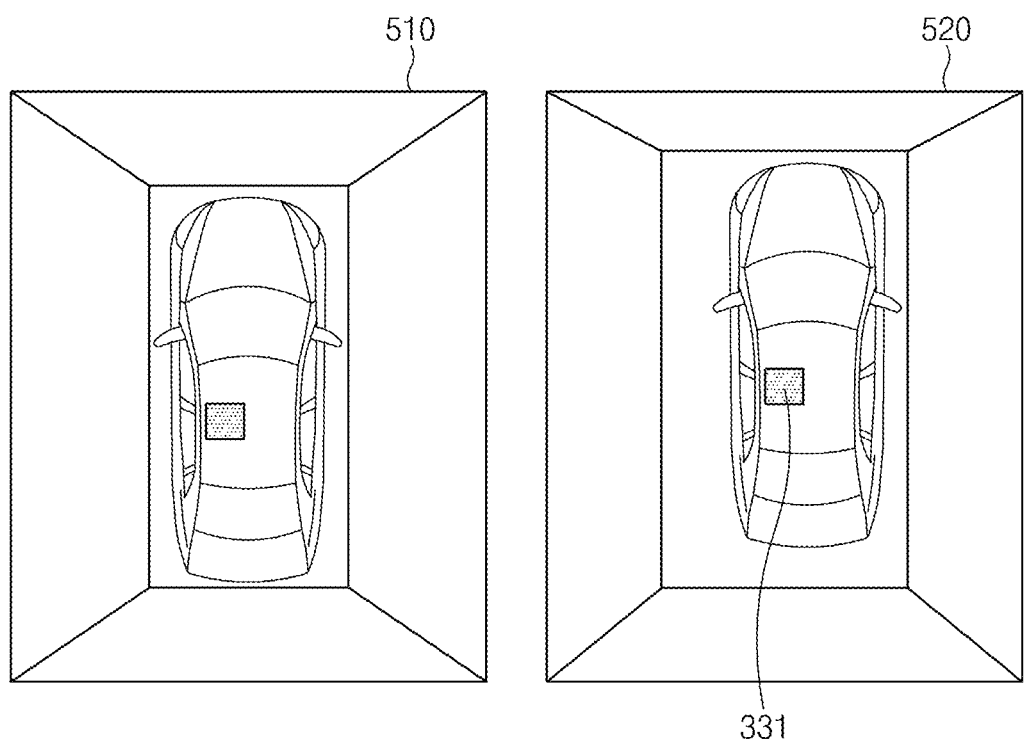
FIG. 5 is a view illustrating another example of the AVM image according to an exemplary embodiment of the present invention.

In addition, as shown in FIG. 5, the display 10 may display an AVM image 510 around the electric vehicle 210. The display 10 may display an AVM image 520 around the position 331 of the inductive power reception module mounted in the electric vehicle 210. The display scheme may be changed by the AVM 40 controlled by the controller 30.

Next, the speaker 20 outputs voice guidance under control of the controller 30. For example, voice guidance "Inductive power transmission module is placed right ahead. Please move the vehicle in one o'clock direction" may be output.

Next, the controller 30 controls all the components such that the components normally perform the functions of themselves.

The controller 30 controls the display 10 such that the display 10 displays the positions of the inductive power reception module mounted in the electric vehicle and the inductive power transmission module mounted in the parking slot in real time using the AVM of the wireless charging electric vehicle of an electromagnetic induction type.

In addition, when the position of the inductive power transmission module is not drawn in the parking slot for charging, the controller 30 may detect the position of the inductive power transmission module based on the indicators 321.

For example, when the inductive power transmission module is standardized such that the inductive power transmission module is placed at the center between four indicators 321, the controller 30 may detect the position of the inductive power transmission module based on the four indicators 321.

As another example, when the inductive power transmission module is standardized such that the inductive power transmission module is placed behind the center between the four indicators 321 by a predetermined interval, the controller 30 may determine the position of the inductive power transmission module based on the four indicators 321.

After all, even though the inductive power transmission module is standardized in any schemes, when the information about the corresponding standardization is known, the controller 30 may detect the position of the inductive power transmission module by using the four indicators 321.

Meanwhile, even though the four indicators 321 are replaced with general parking slot lines, the controller 30 may detect the position of the inductive power transmission module in the same manner.

In addition, the system for guiding wireless charging of an electric vehicle to which an exemplary embodiment of the present invention is applied may further include a navigation system to receive GPS signals, and a plurality of switches for an input by a driver.

Figure 6:
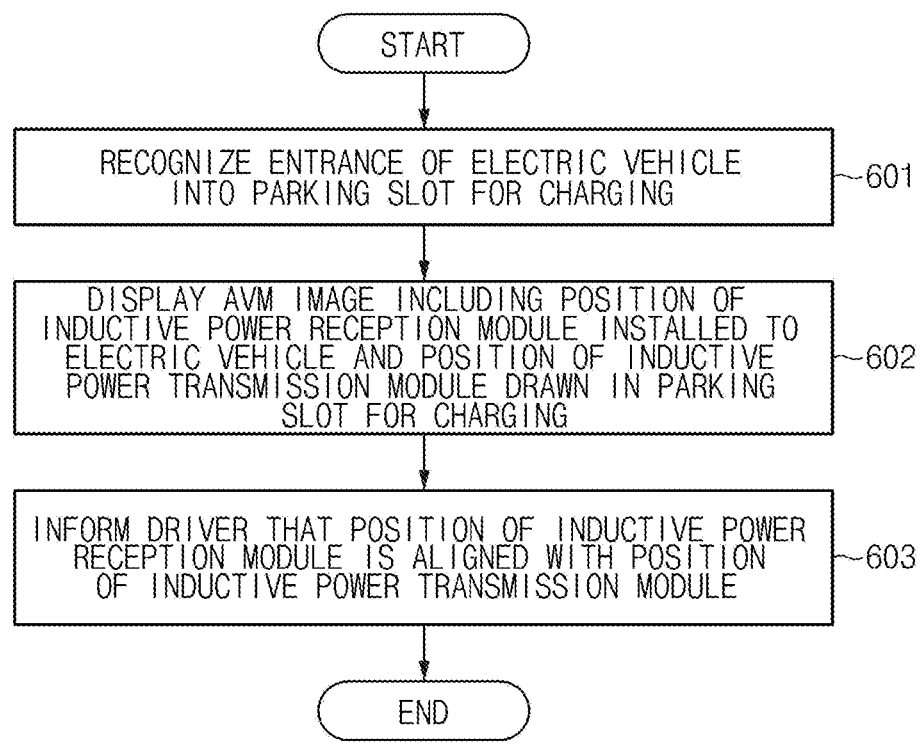
FIG. 6 is a flowchart illustrating one example of a method of guiding wireless charging of an electric vehicle according to an exemplary embodiment of the present invention.

FIG. 6 is a flowchart illustrating one example of a method of guiding wireless charging of an electric vehicle according to an exemplary embodiment of the present invention, where the position of the inductive power transmission module is drawn in the parking slot for charging. The following process is performed by the controller 30.

First, in step 601, it is recognized that an electric vehicle enters the parking slot for charging. In the instant case, the scheme of recognizing that the electric vehicle enters the parking slot for charging may be performed based on the indicators 321 in an AVM image, GPS information, a manual input (a switch operation) by a driver, etc. In addition, when it is recognized based on the GPS information and the manual input by a driver that the electric vehicle enters the parking slot for charging, the AVM 40 is turned on.

Then, in step 602, an AVM image including the position of the inductive power reception module mounted in the electric vehicle 210 and the position of the inductive power transmission module drawn in the parking slot for charge is displayed. In the instant case, as shown in FIG. 3B, the electric vehicle 210 keeps storing the position of the inductive power reception module mounted in the electric vehicle 210.

In the instant case, guide information to help to align the position of the inductive power reception module mounted in the electric vehicle 210 with the position of the inductive power transmission module drawn in the parking slot for charge may be provided to the driver. The guide information may be the moving guide line 410 provided through the display 10, the moving guide line 410 and a guide character provided through the display 10, or voice guidance provided through the speaker 20.

Then, in step 603, when the position of the inductive power reception module mounted in the electric vehicle 210 is aligned with the position of the inductive power transmission module drawn in the parking slot for charge, the driver is informed of the alignment of the positions of the inductive power reception module and the inductive power transmission module through a screen or sound. When the position of the inductive power transmission module is covered by the electric vehicle during the process so that the position of the inductive power transmission module is not photographed, the guide information is replaced with a graphic image.

Figure 7:
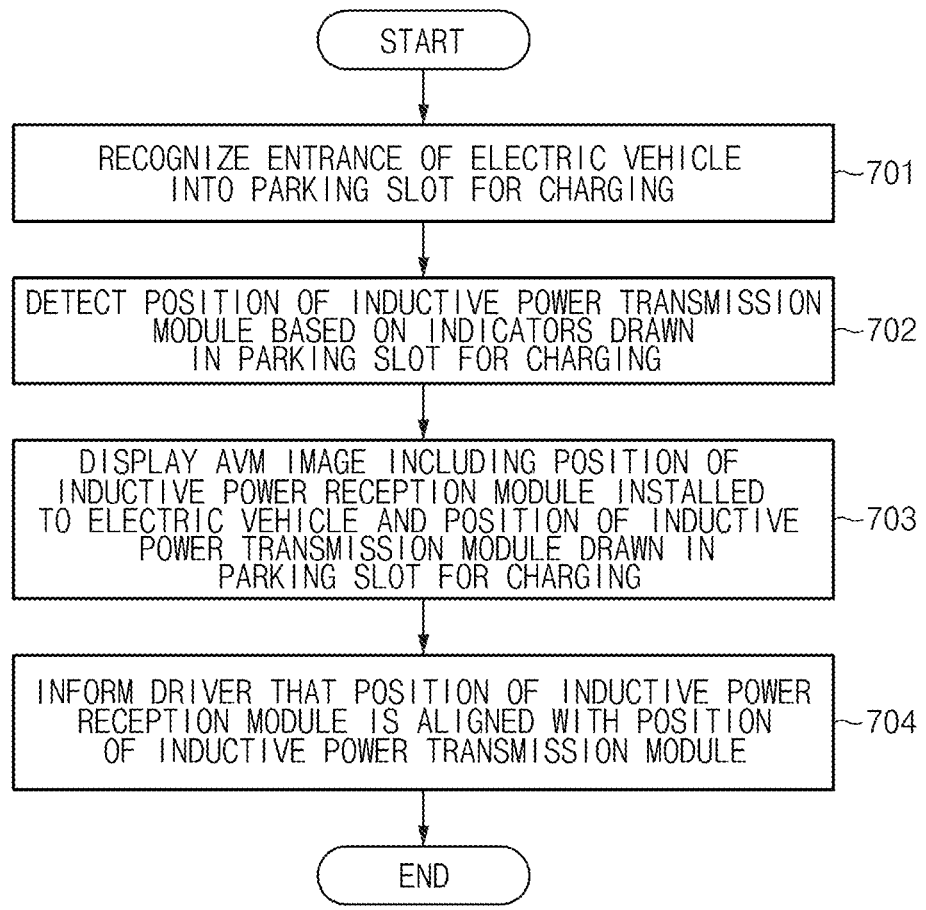
FIG. 7 is a flowchart illustrating another example of a method of guiding wireless charging of an electric vehicle according to an exemplary embodiment of the present invention.

FIG. 7 is a flowchart illustrating another example of a method of guiding wireless charging of an electric vehicle according to an exemplary embodiment of the present invention, where the position of the inductive power transmission module is not drawn in the parking slot for charging. The following process is performed by the controller 30.

First, in step 701, it is recognized that an electric vehicle enters the parking slot for charging. In the instant case, the scheme of recognizing that an electric vehicle enters the parking slot for charging may be performed based on the indicators 321 in an AVM image, GPS information, a manual input (a switch operation) by a driver, etc. In addition, when it is recognized based on the GPS information and the manual input by a driver that the electric vehicle enters the parking slot for charging, the AVM 40 is turned on.

In step 702, the position of the inductive power transmission module is detected based the indicators 321 drawn in the parking slot for charging. For example, the position of the inductive power transmission module may be the center between the indicators 321

Then, in step 703, an AVM image including the position of the inductive power reception module mounted in the electric vehicle 210 and the position of the inductive power transmission module drawn in the parking slot for charge is displayed. In the instant case, as shown in FIG. 3B, the electric vehicle 210 keeps storing the position of the inductive power reception module mounted in the electric vehicle 210. In addition, the position of the inductive power transmission module is displayed in graphic image.

In the instant case, guide information to help to align the position of the inductive power reception module mounted in the electric vehicle 210 with the position of the inductive power transmission module drawn in the parking slot for charge may be provided to the driver. The guide information may be a moving guide line 410 provided through the display 10, the moving guide line 410 and a guide character provided through the display 10, or voice guidance provided through the speaker 20.

Then, in step 704, when the position of the inductive power reception module mounted in the electric vehicle 210 is aligned with the position of the inductive power transmission module drawn in the parking slot for charge, the driver is informed of the fact.

In addition, the method of guiding wireless charging of an electric vehicle may be applicable to an autonomous vehicle.

The method according to an exemplary embodiment of the present invention may be recorded as a computer program. A code and a code segment constituting the program may be readily inferred by a computer programmer in the field. In addition, the program may be stored in computer-readable recording media (information storage media) and may be read and executed by a computer, implementing the method of the present invention. The recording media may include any types of computer-readable recording media.

According to the method of guiding wireless charging of an electric vehicle of the present invention, a wireless charging electric vehicle of an electromagnetic induction type can be guided to optimally align an inductive power reception module mounted in the electric vehicle with an inductive power transmission module mounted in a parking slot by displaying the positions of the inductive power reception module and the inductive power transmission module through AVM in real time, so that the charging efficiency of the electric vehicle is maximized.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of guiding wireless charging of an electric vehicle, the method comprising:
   recognizing, by a controller, an entrance of the electric vehicle into a parking slot for charging the electric vehicle;
   displaying, by the controller, an around view monitor (AVM) image, wherein the AVM image includes a position of an inductive power reception module mounted in the electric vehicle and a position of an inductive power transmission module drawn on the parking slot for charging;
   displaying, by the controller, a moving guide line to align the position of the inductive power reception module with the position of the inductive power transmission module; and
   when the position of the inductive power reception module is aligned with the position of the inductive power transmission module, informing, by the controller, a driver about alignment of the positions of the inductive power reception module and the inductive power transmission module.

2. The method of claim 1, wherein the recognizing of the entrance includes:
   recognizing an indicator informing of the parking slot for charging in the AVM image.

3. The method of claim 1, wherein the recognizing of the entrance includes:
   recognizing the entrance of the electric vehicle into the parking slot for charging based on global positioning system (GPS) information.

4. The method of claim 1, wherein the recognizing of the entrance includes:
   recognizing the entrance of the electric vehicle into the parking slot for charging through a manual input by the driver.

5. The method of claim 1, wherein the displaying of the AVM image includes:
   displaying a moving guide line to align the position of the inductive power reception module with the position of the inductive power transmission module.

6. The method of claim 1, further including:
   outputting voice guidance to align the position of the inductive power reception module with the position of the inductive power transmission module.

7. The method of claim 1, further including:
   displaying a graphic image generated corresponding to a position of the parking slot when the parking slot for charging is covered by the electric vehicle while the position of the inductive power reception module is being aligned with the position of the inductive power transmission module.

8. A method of guiding wireless charging of an electric vehicle, the method comprising:
   recognizing, by a controller, an entrance of the electric vehicle into a parking slot for charging the electric vehicle;
   detecting, by the controller, a position of an inductive power transmission module based on indicators drawn on the parking slot;
   displaying, by the controller, an around view monitor (AVM) image, wherein the AVM image includes a position of an inductive power reception module mounted in the electric vehicle and the detected position of the inductive power transmission module;
   displaying a moving guide line to align the position of the inductive power reception module with the position of the inductive power transmission module; and
   when the position of the inductive power reception module is aligned with the position of the inductive power transmission module, informing, by the controller, a driver about alignment of the positions of the inductive power reception module and the inductive power transmission module.

9. The method of claim 8, wherein the recognizing of the entrance includes recognizing an indicator informing of the parking slot for charging in the AVM image.

10. The method of claim 8, wherein the recognizing of the entrance includes:
    recognizing the entrance of the electric vehicle into the parking slot for charging based on global positioning system (GPS) information.

11. The method of claim 8, wherein the recognizing of the entrance includes:
    recognizing the entrance of the electric vehicle into the parking slot for charging through a manual input by the driver.

12. The method of claim 8, wherein the position of the inductive power transmission module is a center between the indicators.

13. The method of claim 8, wherein the displaying of the AVM image includes:

displaying a moving guide line and a guide character to align the position of the inductive power reception module with the position of the inductive power transmission module.

14. The method of claim 8, further including:
outputting voice guidance to align the position of the inductive power reception module with the position of the inductive power transmission module.

\* \* \* \* \*